(12) United States Patent
Kappes et al.

(10) Patent No.: US 7,752,320 B2
(45) Date of Patent: Jul. 6, 2010

(54) METHOD AND APPARATUS FOR CONTENT BASED AUTHENTICATION FOR NETWORK ACCESS

(75) Inventors: Martin Kappes, Bridgewater, NJ (US); P. Krishnan, North Plainfield, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1271 days.

(21) Appl. No.: 10/721,721

(22) Filed: Nov. 25, 2003

(65) Prior Publication Data
US 2005/0111466 A1 May 26, 2005

(51) Int. Cl.
G06F 15/16 (2006.01)
(52) U.S. Cl. .............................. 709/229; 726/9; 726/24; 709/224
(58) Field of Classification Search .................. 709/229
See application file for complete search history.

(56) References Cited

U.S. PATENT DOCUMENTS

| | | | | | |
|---|---|---|---|---|---|
| 5,655,077 | A | * | 8/1997 | Jones et al. | 726/8 |
| 6,505,300 | B2 | * | 1/2003 | Chan et al. | 713/164 |
| 7,284,267 | B1 | * | 10/2007 | McArdle et al. | 726/11 |
| 7,591,017 | B2 | * | 9/2009 | Watkins et al. | 726/24 |
| 2001/0042213 | A1 | * | 11/2001 | Jemes et al. | 713/201 |
| 2002/0199116 | A1 | * | 12/2002 | Hoene et al. | 713/201 |
| 2003/0005333 | A1 | * | 1/2003 | Noguchi et al. | 713/201 |
| 2003/0140151 | A1 | * | 7/2003 | Daenen et al. | 709/229 |
| 2003/0166397 | A1 | * | 9/2003 | Aura | 455/410 |
| 2003/0167405 | A1 | * | 9/2003 | Freund et al. | 713/201 |
| 2003/0200464 | A1 | * | 10/2003 | Kidron | 713/201 |
| 2004/0049567 | A1 | * | 3/2004 | Manchin | 709/223 |
| 2005/0059352 | A1 | * | 3/2005 | McLean | 455/67.11 |
| 2006/0117384 | A1 | * | 6/2006 | Larson et al. | 726/22 |

OTHER PUBLICATIONS

Kappes, Martin and P. Krishnan. "Content Authentication in Enterprises for Mobile Devices". Apr. 26-27, 2004. IEEE, Advances in Wired and Wireless Communication, 2004 IEEE/Sarnoff Symposium. pp. 1-3.*

(Continued)

Primary Examiner—Shawki S Ismail
Assistant Examiner—Christopher Biagini
(74) Attorney, Agent, or Firm—Joseph B. Ryan; Jason Paul DeMont; Wayne S. Breyer

(57) ABSTRACT

A method and apparatus are provided for authenticating the contents of a device requesting access to a first network, such as an enterprise network. If a device has connected to at least one other network then the content of the device is evaluated prior to obtaining access. The scope of the content evaluation may be based, for example, on properties of the other network or on one or more defined content authentication rules. If a device attempts to access a network, the content of the device is evaluated and the device may be restricted to accessing only one or more restoration services if the content fails to satisfy one or more predefined criteria, such as a content item that is out of date or a determination that the device connected to one or more external networks. The restoration service(s) can update a content item that is out of date, reinstall one or more programs or return configuration settings to default values.

10 Claims, 4 Drawing Sheets

OTHER PUBLICATIONS

Dierks et al., "The TLS Protocol," Network Working Group, Version 1.0, 1-80 (Jan. 1999).

Anne Price, "New Trusted Computing Group Formed to Advance the Adoption of Open Standards for Trusted Computing Technologies," press release (Apr. 2003).

"Get IEEE 802™," IEEE (Jun. 2003).

"InfoExpress", http://www.infoexpress.com/ Publication date: Mar. 19, 2004.

"TCPA—Trusted Computing Platform Alliance", http://www.trustedcomputing.org/home Publication date: Aug. 4, 2003.

* cited by examiner

FIG. 5A

USER DATABASE – 500

| USER NAME (530) | ENCRYPTED PASSWORD (540) |
|---|---|
| JOHN SMITH | 251625... |
| ... | ... |
| BILL FRANKS | 391432... |

DEVICE DATABASE – 550

| DEVICE IDENTIFIER (570) | CONTENT AUTHENTICATION TOKEN (580) | CONTENT AUTHENTICATION POLICY (590) |
|---|---|---|
| JSMITH-LAPTOP | 264765... | STRICT |
| ... | ... | ... |
| LOBBY-PC5 | 422179... | DEFAULT |

555, 560, 565

METHOD AND APPARATUS FOR CONTENT BASED AUTHENTICATION FOR NETWORK ACCESS

FIELD OF THE INVENTION

The present invention relates generally to authentication techniques and more particularly, to methods and apparatus for authenticating a user or device using a content based authentication procedure.

BACKGROUND OF THE INVENTION

A number of security issues arise when computers or other resources are connected over a network. As networks and networked devices become increasingly popular, the security of such networks and network devices becomes even more important. Network designers and system administrators must establish security policies that provide a balance between ease-of-use for users while also protecting the networks and network devices from undesirable events. Most networks and network devices incorporate computer security techniques, such as access control mechanisms, to prevent unauthorized users from accessing the networks or network devices. User authentication is the process of verifying the identity of a user in a computer system, often as a prerequisite to allowing access to resources in the system.

A number of authentication protocols have been proposed or suggested to prevent unauthorized access to networks and networked devices. For example, in many network environments, a user must provide an appropriate password, to prove his or her authority. In addition, one-time, challenge-response passwords have been proposed as a mechanism for further increasing security. Generally, users are assigned a secret key, presumably known only to the user and the authentication host. The secret key may be stored, for example, on a pocket token or a computer-readable card. Upon attempting to access a desired resource, a random value, known as a "challenge," is issued to the user. The user then generates an appropriate "response" to the challenge by encrypting the received challenge with the user's secret key (read from the pocket token or computer-readable card), using a known encryption algorithm, such as the data encryption standard (DES). The user transmits the calculated response to the desired remote resource, and obtains access to the requested resource if the response is accurate. In order to ensure that the pocket token or computer-readable card is being utilized by the associated authorized user, the security may be supplemented by requiring the user to enter a memorized PIN (personal identification number) or password.

Typically, an enterprise network is considered to be the portion of the network that is "inside" the enterprise, i.e., the portion of the network that is protected from "outside" of the enterprise by firewalls and similar security applications. Mobile users (including users connecting through Virtual Private Network (VPN) connections into the enterprise) are fundamentally changing this paradigm. Future threats to an enterprise network will likely come from inside the network and specifically from the mobile devices and users that roam outside the enterprise network. Any network that a mobile device connects to has the potential of becoming the weak link in the enterprise security chain. An enterprise network manager must therefore be concerned with a security lapse resulting in a few compromised devices that provide a hole or conduit for continued unauthorized access from outside of the enterprise network. Such compromised devices could, for example, deliberately open a connection to the outside world and allow the connection to be hijacked. It is not practical to check every connection originating from inside the enterprise, and restricting such connections excessively would impair ease-of-use principles. Further, strong security techniques to prevent man-in-the-middle attacks have the effect of making it difficult to monitor the content of communication.

A need therefore exists for a method and apparatus for authenticating the contents of a device requesting access to a network, optionally in addition to traditional authentication of the user or device.

SUMMARY OF THE INVENTION

Generally, a method and apparatus are provided for authenticating the contents of a device requesting access to a first network, such as an enterprise network. If a device has connected to at least one other network then the content of the device is evaluated prior to obtaining access. For example, the content may be evaluated if the device connected to at least one untrusted or unknown network. A prior connection to another network may be detected, for example, by determining if a token on the device has been altered or by logging an address of each network that the device accesses.

The scope of the content evaluation may be based, for example, on properties of the other network or on one or more defined content authentication rules. For example, the integrity of the content of a device may be ensured by performing a virus scan. In another variation, the integrity of the content of a device may be restored by reinstalling one or more programs or returning configuration settings to default values.

According to another aspect of the invention, a method and apparatus are provided for evaluating a device connecting to a network. If a device attempts to access a network, the content of the device is evaluated and the device may be restricted to accessing only one or more restoration services if the content fails to satisfy one or more predefined criteria. For example, the predefined criteria can include (i) a content item that is out of date; or (ii) a determination that the device connected to one or more external networks. The restoration service(s) can update a content item that is out of date, reinstall one or more programs or return configuration settings to default values.

A more complete understanding of the present invention, as well as further features and advantages of the present invention, will be obtained by reference to the following detailed description and drawings.

BRIEF DESCRIPTION OF THE DRAWINGS

FIGS. 5A and 5B are sample tables from an exemplary user database and device database, respectively, of FIG. 4;

DETAILED DESCRIPTION

Figure 1:
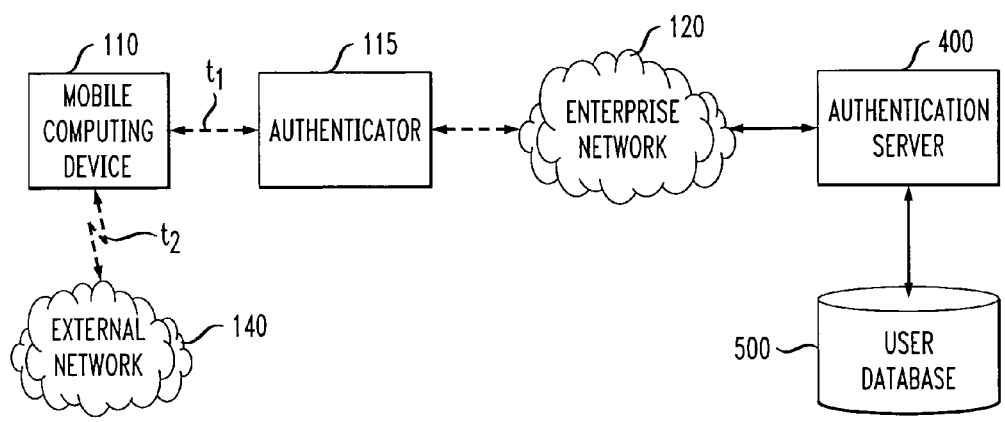
FIG. 1 illustrates a network environment in which the present invention can operate.

FIG. 1 illustrates the network environment in which the present invention can operate. As shown in FIG. 1, a user employing a mobile computing device 110 attempts to access a network 120, such as an enterprise network, or a device or other resource connected to the network 120. According to one aspect of the invention, the user employing the mobile computing device 110 is challenged by an authentication server 400, discussed further below in conjunction with FIG. 4. The authentication server 400 may be associated, for example, with an enterprise or another network where network security is provided. While the present invention is illustrated in the context of an exemplary enterprise network 120, the present invention applies to many network environments where a network security policy is administered. Furthermore, while the user of a mobile device 110 will more likely take advantage of a wireless local area network than a wired network, the content authentication techniques of the present invention are beneficial in both wired and wireless networks.

Security of Wireless Networks

Mobile users increasingly rely on wireless local area networks. The most popular standard for wireless local area networks is IEEE 802.11. It is noted that the emphasis in wireless network security has been on making such networks at least as secure as wired networks, in particular, protecting against man-in-the-middle attacks. This is due to the nature of the wireless medium that allows a hacker to easily monitor and inject traffic.

The original IEEE 802.11 standard, described in IEEE 802.11, "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications," http://standards.ieee.org/getieee802/802.11.html (2001), only provided elementary support for authentication and privacy. For authentication, two modes were defined, namely Open System and Shared Key modes. Generally, the Open System mode allows any client to connect to the network and hence provides no authentication at all. The Shared Key mode authenticates a station if this station and the access point share a secret key (the WEP key). As for privacy, the 802.11 standard defined an encryption mechanism called Wired Equivalent Privacy (WEP) that relied on using the RC4 encryption algorithm (Ron's Code 4—RSA Variable-Key-Size Encryption Algorithm by Ron Rivest).

The mechanisms provided by the IEEE 802.11 standard for authentication and privacy, however, fall short in many respects. First, the standard assumed that the shared key needed for both authentication and privacy were distributed through some secure channel that was not part of the standard. While in theory such mechanisms exist, most if not all 802.11 drivers would require this key to be entered manually. Moreover, the shared key of all stations in such a network was identical. These factors made administration and management of such a network extremely difficult. Furthermore, significant flaws in the WEP encryption algorithm were detected allowing attackers to decipher encrypted frames and eavesdrop, to disrupt the operation of such a network and to gain unauthorized access into a wireless network.

In response to these challenges, the standards body formed a working group, 802.11i that is currently developing a specification for enhanced security. In addition, several companies have developed proprietary solutions countering the security threats of wireless networks.

While other mechanisms, such as Virtual Private Networks (VPNs) on top of the current 802.11 standard, are sometimes used as well, the working group and, in anticipation of the emerging standard, many vendors, have focused on mechanisms for authentication that are based on the IEEE 802.1x port-based access control mechanisms standard. See, IEEE 802.1X-2001, "IEEE Standards for Local and Metropolitan Area Networks: Port-Based Network Access Control," http://standards.ieee.org/getieee802/802.1.html (2001). The 802.1x standard itself does not specify an authentication mechanism but allows for the use of any such mechanism that uses the Extensible Authentication Protocol (EAP).

In addition, some provisions need to be made in addition to 802.1x in order to deal with the specifics of the wireless shared medium. A few new EAP types have been suggested for wireless local networks, such as EAP-TTLS, EAP-LEAP and EAP-PEAP. Most of the new EAP types use Transport Layer Security (TLS) in one way or another. These authentication mechanisms are also used to automatically derive per-user session keys for encryption of frames transmitted over the wireless medium. Using these keys in conjunction with new encryption algorithms, such as the advanced encryption standard (AES), Advanced Encryption Standard (AES), Federal Information Processing Standard 197, http://csrc.nist.gov/publications/fips/fips-197/fips-197.pdf (Nov. 26, 2001), and mechanisms to prevent message forging, replays and other forms of attacks, the security of wireless local area networks can be appropriately ensured.

Once these standards are adopted, clients and APs can mutually authenticate each other. Furthermore, since the wireless communication can be protected from eavesdropping and other risks, wireless local area networks can be used in enterprises without significant additional security risks.

Typically, wired machines and wired (ethernet) jacks in an enterprise, collectively referred to as "open jacks," are considered secure for access purposes. Although mobile (wired) machines could be connected to open jacks, there is an element of physical security, since a user needs physical access to the open jack to connect the mobile device. Technically, an unauthorized router (or network address translation router) could be connected to such jacks; however, providing open access at the other end of such an unauthorized router in a wired way is difficult to arrange. With the increasing use of cheap wireless devices and wireless routers, such open jacks are becoming a security issue. The problem is being exacerbated when the routing devices present an open wireless access with weak or no encryption and authentication to devices and route data to the intranet. Currently, wireless sniffing devices are being used to detect such unauthorized wireless access points. Protocols such as 802.1X can also be implemented to authenticate devices such as routers and switches.

As previously indicated, a number of problems arise from the mobility of client devices, such as mobile computing device 110. Mobile devices 110 passing the boundary of the enterprise network 120 and connecting to a network 140 that is "external" to the enterprise network 120 have essentially left the realm of network administration in the enterprise and are therefore no longer protected by measures taken in the enterprise network 120 to prevent attacks such as, e.g., a firewall or the blocking of certain web pages. While only operating the device 110 in a VPN-tunnel mode to the enterprise network 120 would mitigate some of these problems, this approach is not always feasible as it may increase response times or as VPN traffic may not be allowed in the external network 140 that the mobile device 110 uses. Moreover, the device 110 is prone to attacks before and after the tunnel is established. Thus, the mobile device 110 is dependent on its own protection measures as well as the measures taken by the operator of the external network 140. It is noted that the mobile device 110 connects to the enterprise network 120 and external network 140 at different times, $t_1$ and $t_2$.

While a mobile device 110 could be restricted to connecting only to Access Points (APs) that can present a certificate proving a trusted network provider operates them or a certificate proving that a trusted auditor has audited the network to meet certain security standards, it is not very likely that such certificates will be available in all networks. For example, consider a conference or trade show with free wireless network access for everyone and no authentication mechanism set up or consider a network that uses 802.11i mechanisms but does not present a certificate signed by a trusted certificate authority (CA). Connecting to such a network may pose dangers, for instance, because other users in this network have malicious intentions. It is also conceivable that a malicious access point could be set up in a public environment that would allow connecting to the Internet while attempts to hack into connected devices are made. The use of MAC-layer encryption to protect privacy in such cases also falls short with respect to protecting against eavesdropping as all frames are decrypted in the AP and the traffic may be snooped in the wired part of the network.

In short, when connecting to an external network 140, it cannot be assumed that the network is safe to connect to. For user convenience, connectivity should not be limited to trusted networks or VPN connections only as this would severely constrain usability. If restricting network connectivity to trusted networks only is not an option, then precautions must be taken to mitigate the consequences of potential security breaches and hacks into mobile devices. In particular, a client-sided firewall and a virus scanner should be active at all times that the machine is connected to these untrusted networks 140.

Different configurations of such tools may be used in different network regions, allowing for a range of levels of connectivity (e.g., from full networking to just using HTTP) depending on the threat posed by the external network 140. However, these measures may only mitigate risks to a certain extent. Devices 110 can still get compromised in untrusted areas. Moreover, a device 110 may not know what risk a network 140 poses at the time the device 110 connects to the external network 140. This information may only become available after contacting to a server in the enterprise network 120 or elsewhere in the Internet.

A hacker compromising the security of a mobile client device 110 may gain access to information stored on the device and misuse this device 110 posing a severe threat. However, from an enterprise security perspective, this threat is magnified by orders of magnitude if such a compromised device 110 is allowed to connect to the enterprise network 120 (either through a VPN or through a direct connection). In this case, many of the enterprise protection mechanisms such as firewalls are bypassed and the compromised device could infect other machines in the enterprise network 120 as well.

Content Authentication Paradigm

The present invention provides content authentication as an additional line of defense for mobile devices 110 and enterprise networks 120. As discussed further below, when a device 110 connects to the enterprise network 120, an additional authentication mechanism is used that authenticates the contents of the device 110. This content authentication may either be direct, e.g., by running a program that verifies the content, or indirect, e.g., by proving that the device has not connected to an untrusted network. Furthermore, the device 110 may record all external networks 140 that it has connected to and unusual activities in such networks 140. The authentication server 400 may then trigger countermeasures against potential risks that can range from not connecting the device to the enterprise network 120 to admitting access without additional checks.

Content Authentication Framework

Figure 2:
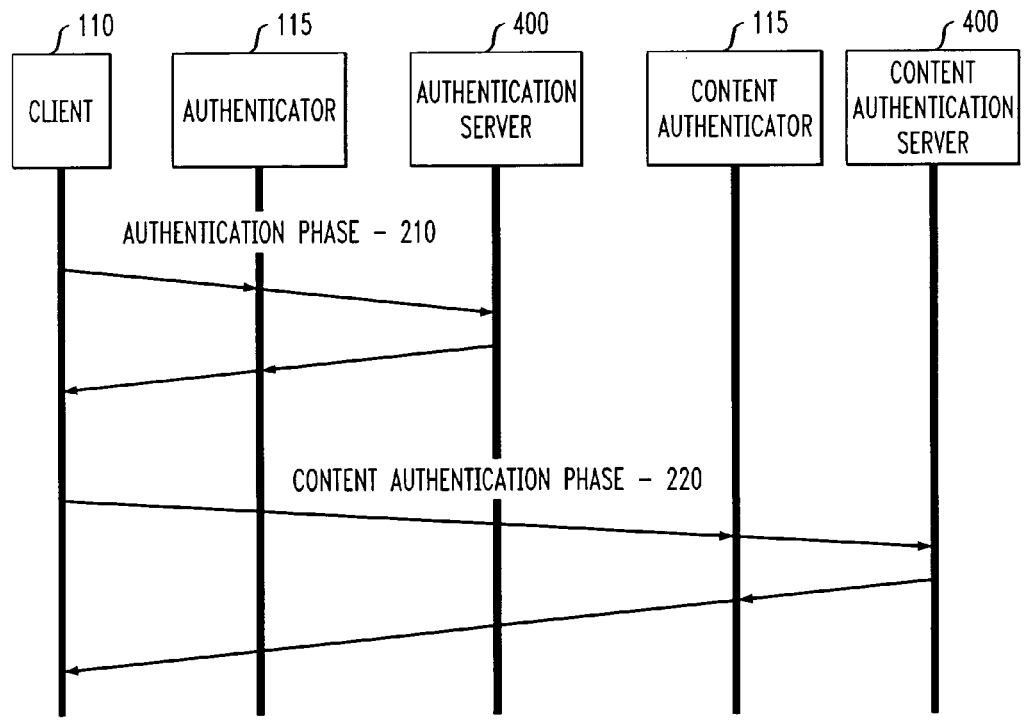
FIG. 2 illustrates an exchange of messages between the entities of FIG. 1 in accordance with the content authentication framework of the present invention.

FIG. 2 illustrates an exchange of messages between the various entities shown in FIG. 1 in accordance with the content authentication framework of the present invention. As shown in FIG. 2, during an initial authentication phase 210, conventional authentication mechanisms, such as an EAP-scheme in the IEEE 802.1x-framework, are employed. If authentication is successful, a second content authentication phase 220 is entered. Analogously to the authentication phase 210, the content authentication phase 220 happens between the client 110 and a content authenticator 115, such as the enterprise associated with the enterprise network 120, which in turn uses the services of a content authentication server 400 in order to verify that the content of the client machine 110 is not compromised.

While the exemplary embodiment performs both the conventional authentication phase 210 and the content authentication phase 220 using the same authentication server 400, discussed below in conjunction with FIG. 4, two or more independent servers could be employed. Furthermore, the authenticator 115 for the conventional authentication phase 210 and the content authenticator phase 220 may reside on different network entities or on the same network device. In addition, while the authentication and content authentication tasks are split into two different phases 210, 220 in the exemplary implementation shown in FIG. 2, it is also possible that these two phases are combined in a single phase authenticating a client 110 and its content. It is further noted that a conventional authentication phase 210 is not a prerequisite for a content authentication phase 220 in accordance with the present invention.

Figure 3:
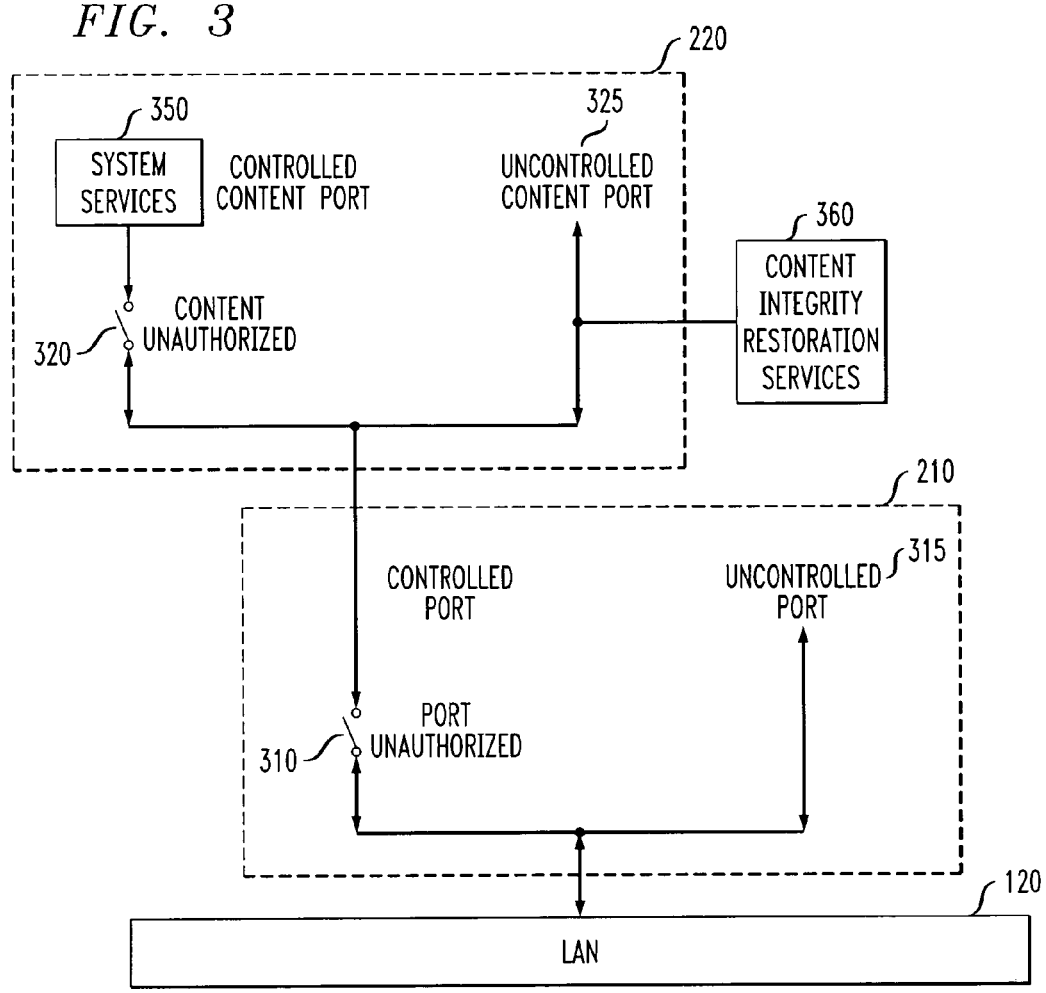
FIG. 3 illustrates a logical process of content authentication phase in accordance with the present invention following a conventional authentication phase.

FIG. 3 illustrates the logical process of content authentication 220 after a conventional authentication 210, such as an authentication in accordance with the 802.1X standard. As shown in FIG. 3, the first authentication phase 210 authenticates the client 110. The authentication phase 210 includes a logical port switch 310 that determines whether or not a user or device can access the network 120. Until a user or device is authenticated, the logical port switch 310 only provides access to an uncontrolled port 315. After a successful authentication, the controlled port switch 310 closes and the client 110 has access to the controlled content port.

The content authentication phase 220 includes a logical port switch 320 that determines whether or not a user or device can access the network 120. Until the content of a device 110 is authenticated, the logical port switch 320 only provides access to an uncontrolled content port 325. After a successful content authentication, the content authentication switch 320 closes and system services 350 associated with the controlled content port can be used.

Intuitively, there is a difference between a failed authentication and a failed content authentication. If authentication fails, the client machine 110 failed to present credentials to verify that the mobile device 110 should gain access to the network. Apart from debugging or initial set-up, it is clear that a device 110 failing to authenticate in this phase 210 should not be granted access to "fix" this problem as excluding it from the network 120 was a deliberate act. If the second phase 220 fails, however, it is clear that the client device 110 is in general welcome to use system services 350. Yet, as there is some problem with the content of the device 110, the device 110 cannot be granted access right away but additional measures have to be taken by a content integrity restoration service 360 to ensure the integrity of the content of the device 110.

If a client device 110 was compromised, restoring the content of the machine into a state such that the device 110 can be authenticated again (if possible at all) may require a "cleanup-operation" that may require the interaction of the client 110 with some server in the network 120. Hence, even if the content authentication phase 220 fails, some content integrity restoration services 360 may be available to the client 110, as shown in FIG. 3 and discussed further below in conjunction with FIG. 7. It is noted that only frames necessary for content restoration can be exchanged until the content of the client device 110 is cleaned and the client device 110 is authenticated; standard packet filtering techniques can ensure that only such frames are admitted into the network 120.

Figure 4:
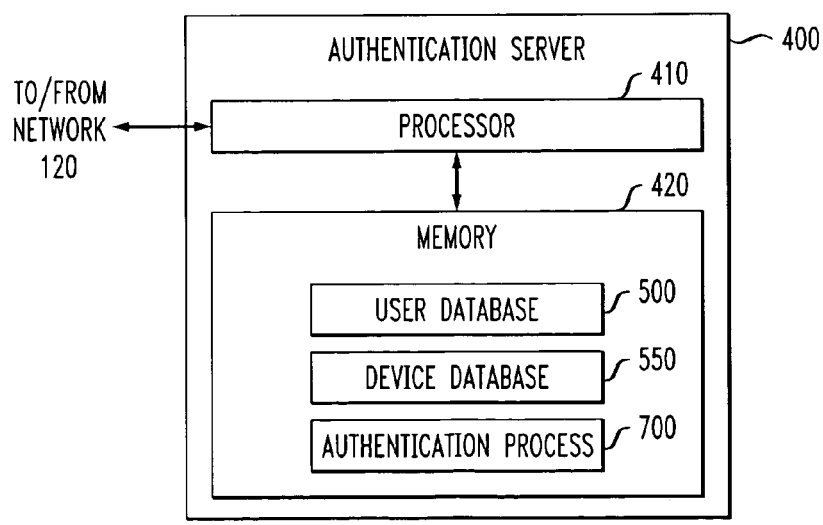
FIG. 4 is a schematic block diagram illustrating the authentication server of FIG. 1 in further detail.

FIG. 4 is a schematic block diagram of an exemplary authentication server 400 incorporating features of the present invention. The authentication server 400 may be any computing device, such as a personal computer, work station or server. As shown in FIG. 4, the exemplary authentication server 400 includes a processor 410 and a memory 420, in addition to other conventional elements (not shown). The processor 410 operates in conjunction with the memory 420 to execute one or more software programs. Such programs may be stored in memory 420 or another storage device accessible to the authentication server 400 and executed by the processor 410 in a conventional manner.

For example, as discussed below in conjunction with FIGS. 5A, 5B and 6, the memory 420 may store a user database 500, a device database 550 and a token-based authentication process 700. Generally, the user database 500 records authentication information for each authorized user and the device database 550 records authentication information for each authorized device. The authentication process 700 employs a content-based authentication protocol incorporating features of the present invention to authenticate a user or device.

FIG. 5A is a sample table from an exemplary user database of FIGS. 1 and 4. The user database 500 records authentication information for each authorized user. As shown in FIG. 5A, the user database 500 consists of a plurality of records, such as records 505-515, each associated with a different authorized user. For each authorized user, the user database 500 identifies the user in field 530, and the corresponding password (or alternate response to a challenge) in field 540.

FIG. 5B is a sample table from an exemplary device database of FIG. 4. The device database 550 records authentication information for each authorized device. As shown in FIG. 5B, the device database 550 consists of a plurality of records, such as records 555-565, each associated with a different authorized device. For each authorized device, the device database 550 identifies the device in field 570, and a corresponding content authentication token in field 580, discussed further below in a section entitled "Token Scheme for Triggering Content Authentication." In addition, the device database 550 optionally includes a field for identifying a content authentication policy for the corresponding device in field 590. For example, the content authentication policy identified in field 590 may be a label, such as "strict," "default" or "less restrictive," that identifies a set of applicable content authentication rules that evaluate the content of a device to varying degrees. The applicable content authentication rules may also vary, for example, based on the perceived risk associated with various external networks that a given device accessed.

Token Scheme for Triggering Content Authentication

In one implementation, the content authentication performed during the content authentication phase 220 employs an uncompromised token approach (UTA) that uses an indirect method of authenticating the contents of a device 110. Suppose that the device 110 and the authentication server 400 share a secret that was established after the last successful content authentication with the server 400. In the following, this secret is referred to as a content authentication token. When a security alert event on the device 110 occurs, this content authentication token is deleted or altered on the device 110. During the next content authentication with the server 400, the server 400 will detect the absence of the content authentication token as it is used in a challenge-response scheme. The absence of the content authentication token indicates that the device 110 was potentially compromised. In other words, the presence of the content authentication token is a signal that no security flags on the device have been raised.

Client-Side Content Token Processing

Figure 6:
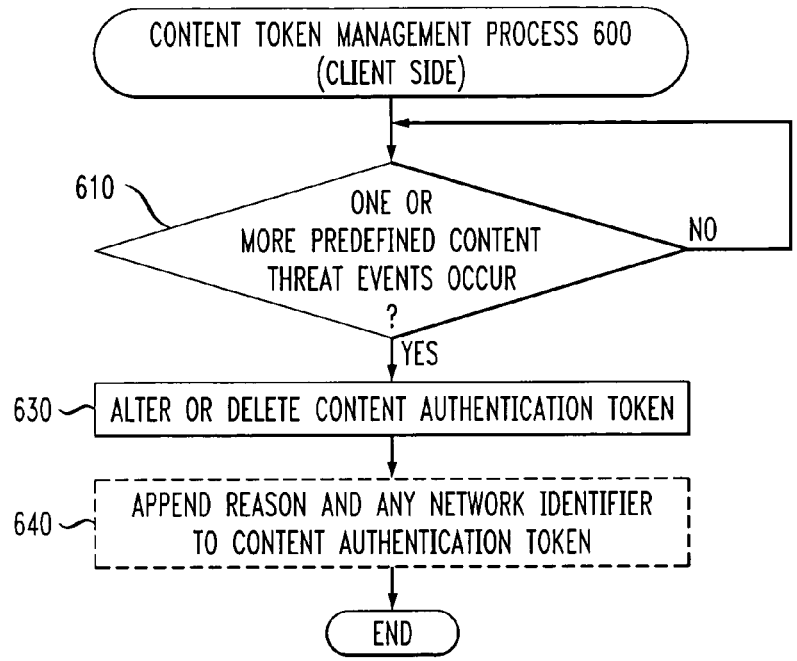
FIG. 6 is a flow chart describing an exemplary implementation of a content token management process performed by the client device of FIG. 1 and incorporating features of the present invention.

FIG. 6 is a flow chart describing an exemplary implementation of a content token management process 600 performed by each client device 110 of FIG. 1 in order to maintain the content token 550 in accordance with one embodiment of the present invention. For example, the following exemplary security alert may trigger an alteration or deletion of the content authentication token 550 associated with a given device 110. The first example is the operation of the device 110 in an external network 140 that is untrusted, referred to herein as an untrusted network zone. Generally, the content token management process 600 continuously monitors the environment of the device 110 to determine if one or more predefined conditions occur that require the alteration or deletion of the content authentication token 550. If the content authentication token 550 is altered or deleted by a given device 110, the altered or deleted token will be detected by the authentication process 700, discussed below in conjunction with FIG. 7, performed by the authentication server 400 the next time the device 110 attempts to access the home network 120.

In the exemplary embodiment, one or more predefined conditions can trigger the alteration or deletion of the content authentication token 550, such as the connection of the device 110 to an unknown or untrusted network 140, or a virus alert or the disabling or expiration of a virus scanner on the device 110. As shown in FIG. 6, a test is performed during step 610 until one or more predefined conditions are detected to trigger the alteration or deletion of the content authentication token 550. For example, when a device 110 attempts to connect to a new network zone, the content token management process 600 on the device 110 detects the new network connection during step 610 and determines whether a trusted network provider operates this zone. If a trusted network provider does not operate the zone, or if another predefined condition is detected, such as a virus alert, disabling or expiration of a virus scanning program, the content authentication token is altered or deleted during step 630. If the content authentication token is altered during step 630, the alteration may optionally include a reason for the alteration signed by using the content authentication token, as well as an identifier of the network, that can be recorded by the content token management process 600 in a tamper-proof way during step 640.

As discussed further below in conjunction with FIG. 7, after being connected to the home network 120, the device 110 ships the signed ID of the network back to the enterprise content authentication server 400, where the ID can be checked against an extensive list of trusted networks. Therefore, each device 110 need not have an extensive local database of trusted networks, and the content authenticator may reissue a content authentication token without forcing content authentication. This scheme can be extended so that the client 10 can record the ID of multiple networks by morphing its content authentication token in a deterministic way so that the server 400 can recreate the morphed content authentication token and verify the validity of the networks that the client connected to.

The content authentication token framework can and the token scheme be implemented with a trusted program (or a set of trusted programs) running on the client device 110. The trusted program can be provided, for example, on a Smart Card, driver or run inside a secure portion of the device 110. See, for example, The Trusted Computing Platform Alliance, http://www.trustedcomputing.org. This trusted program may require both hardware and software methods to ensure that it cannot be compromised, and can use existing techniques for its implementation. This secure program can participate in the challenge/response protocol for content authentication. A challenge could, for example, be a list of files and one-time chosen start and end segments within these files. The program could generate, for example, a Message Digest 5 (MD5) signature out of the challenged file segments and send an encrypted version of this signature to authenticate its contents. Various optimizations can be done that, for example, check files based on their time of update. The one-time challenge/response nature of the content authentication process in conjunction with the trusted nature of the verification program ensures it from attacks including replays and infections.

Server-Side Content Token Processing

Figure 7:
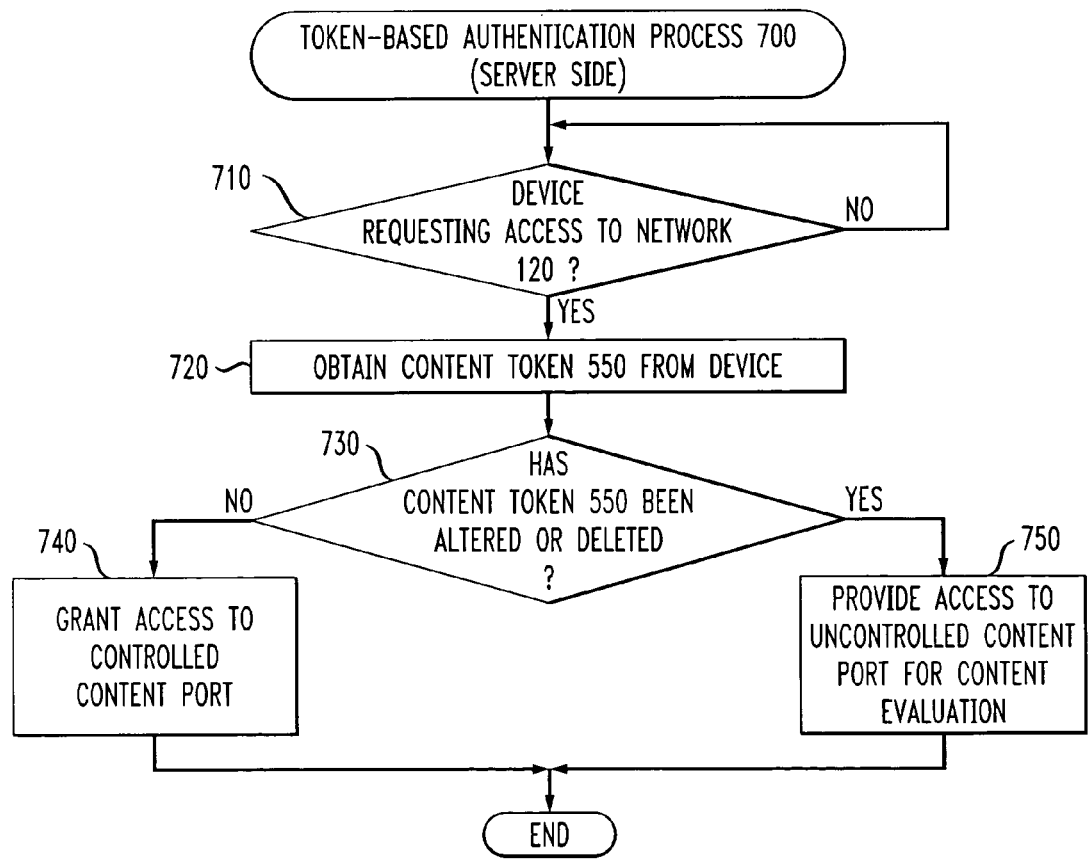
FIG. 7 is a flow chart describing an exemplary implementation of an authentication process of FIG. 4 incorporating features of the present invention.

FIG. 7 is a flow chart describing an exemplary implementation of an exemplary token based authentication process 700 that is performed by the authentication server 400 of FIG. 4. As previously indicated, the exemplary authentication process 700 employs a content-based authentication protocol incorporating features of the present invention to authenticate a device 110. As shown in FIG. 7, the authentication process 700 performs a test during step 710 until a device 110 requesting to access the network 120 is detected. Initially, when a device 110 connects back to its home network 120, the authentication process 700 checks the device 110 for the content authentication token 550 during step 720. A test is performed during step 730 to determine if the content authentication token 550 is value. If it is determined during step 730 that the device 110 presents a valid content authentication token, then the device 110 is allowed to access the network 120 during step 740.

If, however, it is determined during step 730 that the device 110 presents an altered content authentication token or cannot present the content authentication token at all, then the device 110 has been in a network zone that was not deemed trustworthy (or there has been a problem with the virus checker in the exemplary embodiment) and steps to ensure or restore the integrity of the content of the device must be taken during step 750. For example, if it is determined during the 730 that one or more installed software programs, such as a virus scan product, are not up to date, the device 110 may be limited to only accessing the restoration service 360 until the programs are updated.

For example, the integrity of the content may be ensured during step 750 by performing a virus scan. The scope or degree of the virus scan may optionally be varied based on information that may be known about the external network(s) 140 to which the device 110 connected. For example, if a device 110 connected to a network 140 that is known to be a significant risk, the device 110 may be required to undergo an extensive virus scan or even a scan to identify all files that have been altered. In another variation, the integrity of the content may be restored during step 750, for example, by reinstalling one or more programs or returning configuration settings to default values.

In yet another variation, the scope or degree of the steps undertaken to ensure or restore the integrity of the content may vary dependent upon patterns of behavior of the user or device 110. For example, if a given user frequently connects to a network at his or her residence, then perhaps a minimal virus scan is performed, if any. If unusual behavior is detected, for example, for a user or device that normally does not connect to external networks 140, then a more rigorous evaluation and restoration procedure may be appropriate.

As alternative to the token based implementation described above, the network addresses of each of the external networks 140 accessed by a device 110 may be captured and logged by a server, such as the server 400. In this manner, when the device 110 connects to the home network 120, the logged addresses can be evaluated to determine if the device 110 connected to any suspicious or unknown networks. The address of each of the accessed external networks 140 can be obtained, for example, by requiring the client device 110 to forward the source address of each external network 140 to the server 400. It is noted that port based access control mechanisms that have authentication between peers, such as the IEEE 802.1x access control mechanism, provides a mechanism for the client to identify each network that it connects to. Again, the hardware and software mechanisms used to implement the logging of the network addresses of the external networks 140 can be implemented using tamper-resistant techniques.

Strength of the Content Authentication Token Scheme

A benign user is a user that fully complies with enterprise security policies and does not try to work around security measures that are deemed inconvenient. For such a benign user, the disclosed content authentication token scheme works reliably even if the device is not equipped with a trusted component, such as a smart card.

An authenticated renegade is a user that is authorized to use the network and who wants to use the network for legitimate purposes. For the sake of his or her convenience or adventure, however, the authenticated renegade may defy corporate security measures once in a while. For such a authenticated renegade user, the content authentication token scheme works reliably if the device 10 in question is equipped with a trusted component. If this is not the case, the user may circumvent the content authentication token-based approach by attempts to restore the content authentication token after its deletion and alteration. To prevent this, countermeasures need to be taken and the content authentication token should be stored in a way that makes restoration difficult (and less convenient as compared to going through a content-based authentication; e.g., not store the content authentication token in a simple file in the file system).

A malicious user may misuse the machine in many ways without compromising the content of the machine at all. While the content authentication token scheme may also have some applications in this area, conventional approaches to network security such as intrusion detection appear more promising as the content authentication paradigm is intended to help with authorized users that unknowingly and unwillingly operated a device that became (potentially) compromised. In other words, the problem of protecting networks from machines that may be carriers of unauthorized content is addressed, not the problem of detecting malicious users.

Article of Manufacture and System Considerations

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   detecting, at a server, that a device is attempting to connect to a network;
   receiving, at the server, a token from the device, wherein the token is in one of:
   i. a first state in which the content of the token indicates that the token has not been modified by the device, and
   ii. a second state in which the content of the token indicates that the token has been modified by the device, wherein when the token is in the second state, the content of the token comprises:
      an indication that the execution of a security software application executing on the device was suspended, and
      an identification of a network to which the device was connected when the execution of the security software application was suspended;
   when the token is in the second state, determining, at the server, if the device was previously connected to an untrusted network; and
   if the device was connected to an untrusted network, evaluating the integrity of data on the device, wherein the integrity evaluation is performed by at least one of the device and the server.

2. The method of claim 1, wherein the scope of the integrity evaluation depends on the frequency at which the device connects to the network identified by the token when the token is in the second state.

3. The method of claim 1, comprising:
   permitting, at the server, the device to connect to a the network on a first port, when the token is in the first state; and
   permitting, at the server, the device to connect the network on a second port when the token is in the second state; and
   wherein only frames that are necessary for content restoration are permitted to flow between the network and the device when the device is connected to the network on the second port.

4. The method of claim 1, wherein determining further comprises logging an address of each network that the device connected to.

5. The method of claim 1, wherein the scope of the evaluation is based on a content authentication rule.

6. The method of claim 1, wherein evaluating further comprises performing a virus scan.

7. An apparatus comprising:
   a memory; and
   a processor, coupled to the memory, for:
   detecting that a device is attempting to connect to a network;
   receiving a token from the device, wherein the token is in one of:
   i. a first state in which the content of the token indicates that the token has not been modified by the device, and
   ii. a second state in which the content of the token indicates that the token has been modified by the device, wherein when the token is in the second state, the content of the token comprises:
      an indication that the execution of a security software executing on the device was suspended, and
      an identification of a network to which the device was connected when the security software was suspended;
   when the received token is in the second state, determining if the device was previously connected to an untrusted network; and
   if the device was connected to an untrusted network, evaluating the integrity of data on the device.

8. The apparatus of claim 7, wherein the scope of the integrity check depends on the frequency at which the device connects to the network identified by the token when the token is in the second state.

9. The apparatus of claim 7, wherein the processor is further configured to evaluate a log of addresses of each network that the device accessed.

10. The apparatus of claim 7, wherein the scope of the evaluation is based on one or more defined content authentication rules.

* * * * *